United States Patent [19]

Hongo et al.

[11] Patent Number: 5,080,295
[45] Date of Patent: Jan. 14, 1992

[54] WIRE TENSIONER FOR A WIRE HANDLING MACHINE

[75] Inventors: Nobuhisa Hongo, Gumma; Kenji Kanai, Tochigi; Takayuki Maezawa, Gumma, all of Japan

[73] Assignee: Mitsuba Electric Manufacturing Co., Ltd., Kiryu, Japan

[21] Appl. No.: 480,731

[22] Filed: Feb. 16, 1990

[30] Foreign Application Priority Data

Feb. 17, 1989 [JP] Japan ................................. 1-37526

[51] Int. Cl.⁵ .......................................... B65H 59/38
[52] U.S. Cl. .................................. 242/45; 242/7.05 R; 242/155 M
[58] Field of Search ................. 242/45, 155 R, 155 M, 242/7.01, 7.04, 7.05 R, 7.05 A, 7.05 B, 7.05 C

[56] References Cited

FOREIGN PATENT DOCUMENTS 884075 12/1961 United Kingdom ............ 242/155 R

Primary Examiner—Stanley N. Gilreath
Attorney, Agent, or Firm—Marshall & Melhorn

[57] ABSTRACT

A wire tensioner, for feeding wire from a wire source to a wire handling machine such as a coil winding machine, comprising a tension pulley coupled with an output shaft of a motor via a clutch such as an electromagnetic powder clutch with a variable torque transmission capability. Wire is passed around the tension pulley which is turned by the motor in the direction opposite to the feeding direction of the wire. By controlling the torque transmission ratio of the clutch, the tension of the wire is controlled with a fast response. This tensioner can be advantageously used for a motor coil winding machine to removing any slacking in the coil wire and improving the wire density of the motor coils.

4 Claims, 3 Drawing Sheets

WIRE TENSIONER FOR A WIRE HANDLING MACHINE

TECHNICAL FIELD

The present invention relates to a wire tensioner for feeding wire from a wire source to a wire handling machine such as a coil winding machine, and in particular to a wire tensioner which is suitable for use for feeding coil wire to a motor coil winding machine.

BACKGROUND OF THE INVENTION

In winding coils on motor armatures, it is necessary to keep the coil wire taut throughout the coil winding operation in order to ensure a necessary density of the coil wire in each coil. Conventionally, a self-adjusting brake was used to apply an appropriate tension to the coil wire. According to such a brake, when there is an increase in the tension of the wire, this causes an increase in the deflection of the spring member which in turn causes a reduction in the braking force applied to an upstream end of the coil wire, thereby keeping the tension of the wire substantially at a constant level. However, such a brake can offer a limited precision in controlling wire tension, and is often inadequate for modern high speed motor coil winding machines.

Furthermore, in winding coils around core teeth of an armature, it is necessary to hook the coil wire around risers between succeeding coil winding steps and terminal ends of the coil wires must be severed, and these additional steps in motor coil winding operations require different coil wire tensions, but conventional brakes are totally incapable of varying the tension of the coil wire, and imposed a severe restriction in obtaining high quality coils and speeding up the coil winding operation.

BRIEF SUMMARY OF THE INVENTION

In view of such problems of the prior art, a primary object of the present invention is to provide a wire tensioner which can control wire tension at a high precision.

A second object of the present invention is to provide a wire tensioner which can variably control wire tension with a fast response speed.

A third object of the present invention is to provide such a wire tensioner which is compact and economical to manufacture.

These and other objects of the present invention can be accomplished by providing: a wire tensioner for feeding wire from a wire source to a wire handling machine while applying a variable tension to the wire, comprising: a frame; a rotatable body rotatably supported by the frame to wind a part of the wire thereon; power drive means for rotating the rotatable body at a circumferential speed which is different from a feeding speed of the wire; clutch means interposed between the power drive means and the rotatable body, having a capability to vary its torque transmission ratio; and control means for acting upon the clutch means to vary its torque transmission ratio according to a demand from the wire handling machine.

Thus, it is possible to conduct a coil handling operation such as a motor coil winding operation while applying an appropriate tension to the wire at all time so that coils may be wound without any slack and at a high density. When this invention is applied to a motor coil winding operation, by eliminating slack from the coil wire, the reliability of the motor can be improved, and, by increasing the density of the coil wire wound on each core tooth, the size of the motor can be reduced.

According to a preferred embodiment of the present invention, the rotatable body is rotated in a direction opposite to a feeding direction of the wire, and the clutch means consists of an electromagnetic powder clutch.

For a certain wire handling operation, it is advantageous that the wire tensioner further includes a clamp for clamping an outlet end of the wire. It is possible to control wire tension according to an actually measured tension at the outlet end of the wire tensioner, but, by pre-programming a pattern of wire tension according to the operation cycle of the wire handling machine, the structure of the control unit can be simplified.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENTS

Figure 1:
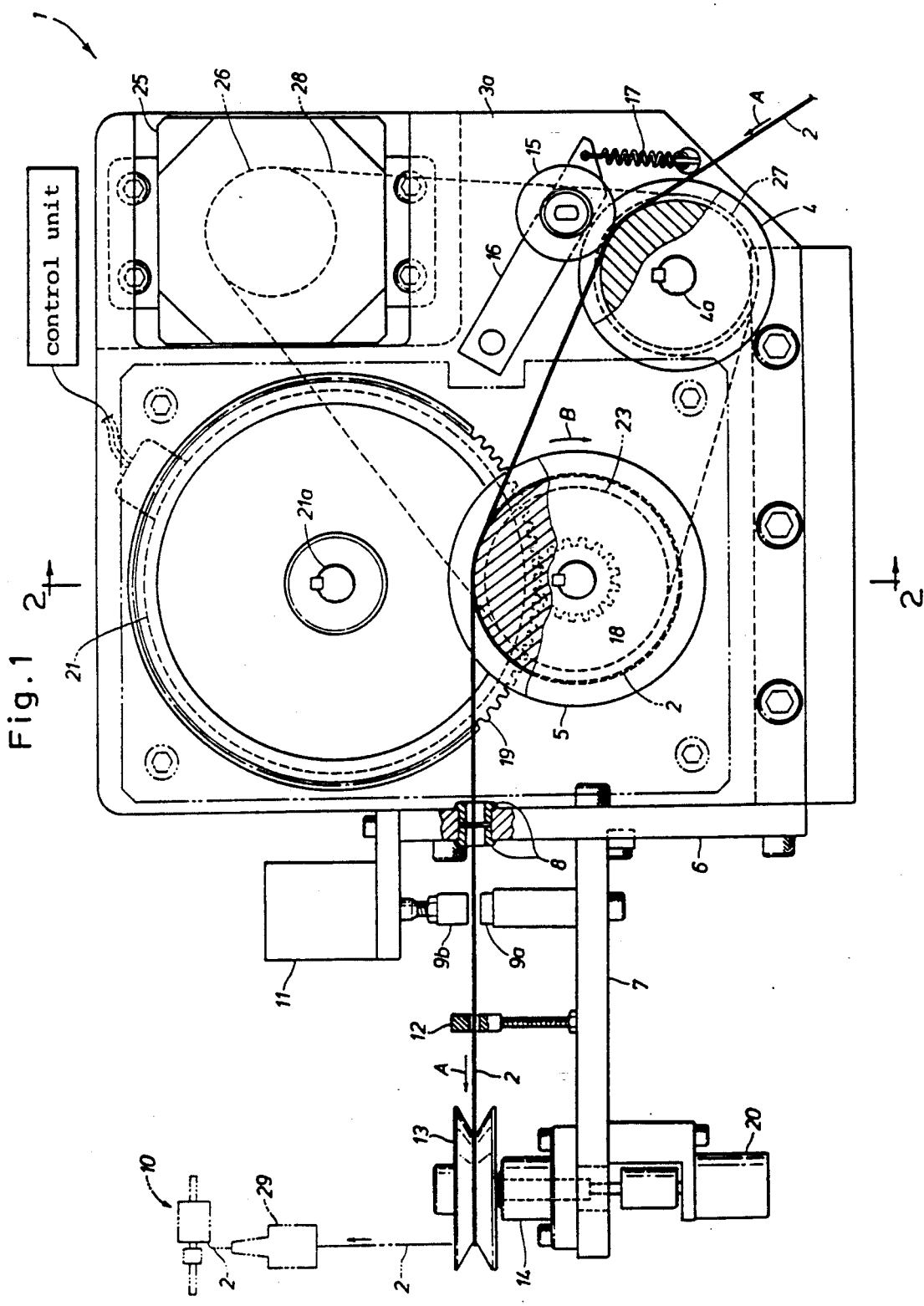
FIG. 1 is a front view of a preferred embodiment of the wire tensioner according to the present invention.
Figure 2:
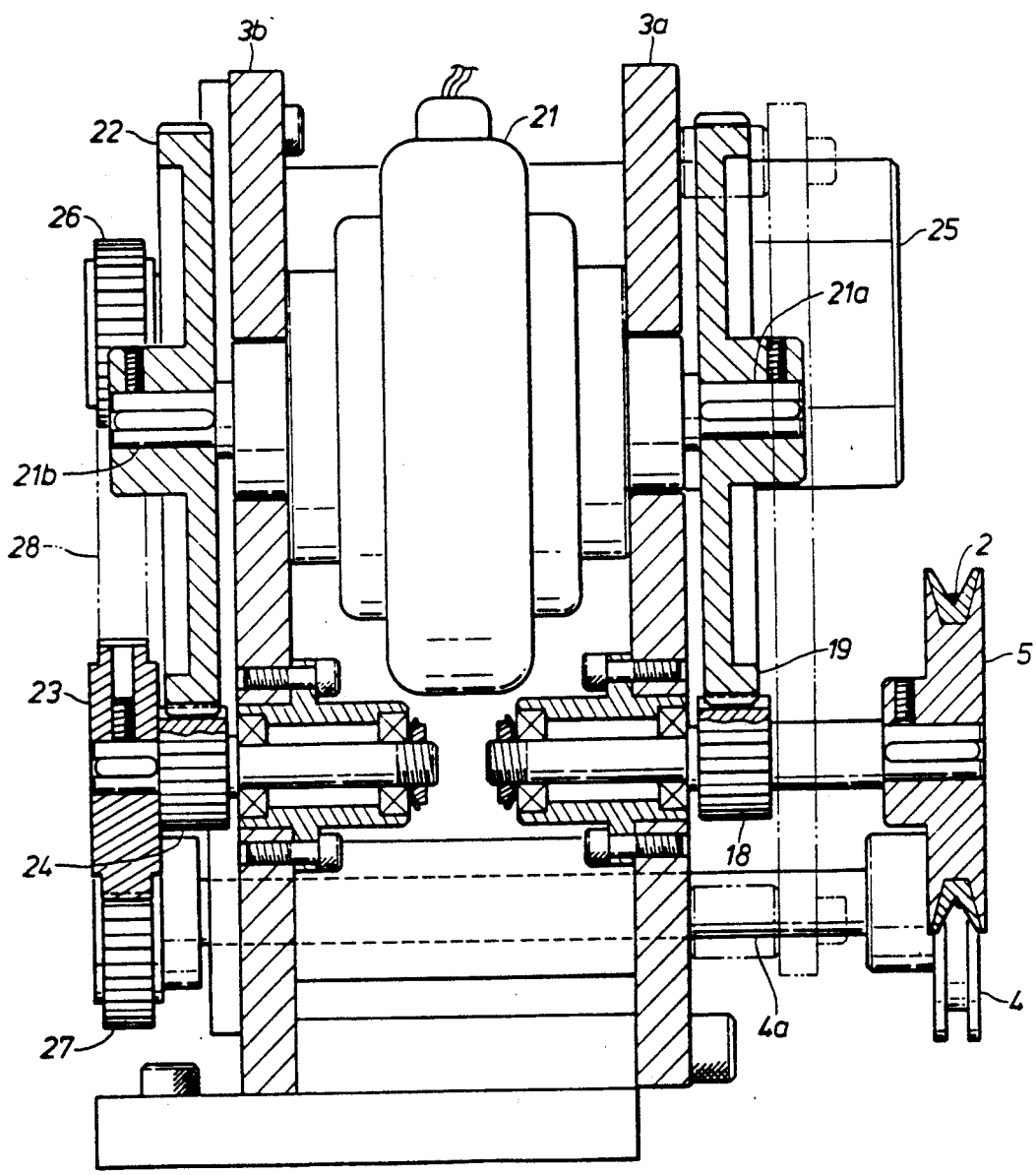
FIG. 2 is a sectional side view of the wire tensioner.

FIGS. 1 and 2 show an embodiment of the wire tensioner according to the present invention which is designed as a part of a coil winding machine for a motor armature. Wire 2 which is to be ultimately wound on an armature 10 is fed from a lower right end of FIG. 1 to a coil winding machine 29 illustrated in an upper left part of FIG. 1 by means of a wire tensioner 1 in the direction indicated by the arrow A.

This wire tensioner 1 comprises a planar and rectangular base plate 3a which is supported on a fixed base not shown in the drawings, a guide pulley 4 rotatably supported by the base plate 3a at an inlet end of the wire tensioner 1, and a tension pulley 5 rotatably supported by a central part of the base plate 3a. The wire 2 is wrapped around the tension pulley 5 by a few turns.

An upright bracket 6 is fixedly secured to a left end portion of the base plate 3a and extends substantially perpendicularly from the plane of the base plate 3a. A lateral bracket 7 is fixedly secured to the upright bracket 6 and extends laterally (leftward as seen FIG. 1) therefrom. The upright bracket 6 is provided with a wire eye 8 consisting of two cylindrical parts fitted into an opening of the upright bracket 6 from either side thereof for leading out the wire 2 from the tension pulley 5. The wire 2 led out from the wire eye 8 can be secured between a fixed member 9a securely attached to the lateral bracket 7 and a moveable member 9b adapted to be actuated by a jig cylinder 11 secured to the upright bracket 6. This clamping structure may be conveniently used to secure the wire in case of a wire breakage at the coil winding machine 29 and prevent the wire from being pulled back by the tension pulley 5 which rotates in opposite direction to the feeding direction of the wire. The lateral bracket 7 further carries a guide member 12 for restricting lateral movement of the wire 2, and a guide pulley 13 which is rotatably supported by the lateral bracket 7 by way of a bearing 14 at an outlet end of the wire tensioner 1 to change the direction of the wire 2 by 90 degrees.

Thus, the wire 2 which has passed through the wire eye 8 is guided by the guide member 12 and is then changed of its direction by the guide pulley 13 towards the armature 10. A rotary encoder 20 attached to the other side of the lateral bracket 7 is coupled with the base end of the pivot shaft of the guide pulley 13 to measure the rotation of the pulley 13 for the purpose of controlling the tension of the wire 2 as described hereinafter.

At the inlet end of the wire tensioner 1, a pressure roller 15 rotatably carried by a lever member 16 presses the wire 2 against the guide roller 4. The lever member 16 is pivotally supported by the base plate 3a at its base end, and a tension coil spring 17 is connected between a free end of the lever member 16 and part of the base plate 3a so as to urge the pressure roller 15 against the guide roller 4.

Referring to both FIGS. 1 and 2, an electromagnetic powder clutch 21 is interposed between the base plate 3a and a second base plate 3b extending in parallel with the first mentioned base plate 3a and secured to the first base plate 3a in a spaced relationship. An output shaft 21a of the powder clutch 21 extending from the outer surface of the first base plat 3a securely carries a large gear 19 which meshes with a small gear 18 secured coaxially to the tension pulley 5. An input shaft 21b of the powder clutch 21 extending from the outer surface of the second base plate 3b carries a second large gear 22, which is substantially identical to the first large gear 19, securely attached thereto. The second large gear 22 meshes with a small gear 24 which is coaxially and integrally attached to a transmission pulley 23. The transmission pulley 23 is rotatably supported by the second base plate 3b and is driven by an induction motor 25 via a drive pulley 26 attached to an output shaft of the motor 25 projecting outwards from the second base plate 3b and a timing belt 28 passed around the drive pulley 26, the transmission pulley 23 and yet another pulley 27 secured coaxially and integrally to the guide pulley 4. In short, by activating the drive motor 25, not only the guide pulley 4 is rotated but also the tension pulley 5 is rotated via the powder clutch 21. It should be noted that the tension pulley 5 rotates in opposite direction (as indicated by the arrow B) to the direction of the movement of the wire 2 (which is indicated by the arrow A).

Now the operation of this wire tensioner 1 is described in the following with reference to the time chart given in FIG. 3.

When it is ready to start winding the wire 2 on an armature 10, the drive motor 25 is activated so as to turn the tension pulley 5 in the direction indicated by the arrow B. Then, a spindle motor and an indexing motor not shown in the drawings are activated to carry out a hooking operation at the coil winding machine 29.

During an early part of this hooking operation, the powder clutch 21 delivers torque at an intermediate torque transmission ratio corresponding to an intermediate current value M which is supplied to the powder clutch 21 by a control unit according to a predetermined program. Thus, the tension pulley 5 rotates in the opposite direction (direction B) to the feeding direction of the wire 2 (direction A) as shown in FIG. 1, and the tension pulley 5 applies a frictional resistance to the wire 2. Since the frictional resistance working against the feeding movement of the wire 2 is substantially proportional to the transmission torque of the powder clutch 21, it is possible to apply a desired tension to the wire 2 by applying a suitable current to the powder clutch 21. During a later part of the hooking operation, the control unit applies a low current L to the powder clutch 21 which is then followed by an even lower current HL so as to reduce the tension of the wire 2 in two steps and carry out a favorable hooking operation.

Thereafter, while the current setting is kept set at HL or while the tension of the wire 2 is at a reduced level, an indexing step is carried out as a step preliminary to the step of actually winding a coil around the armature 10. During the step of winding a coil around the armature 10, the current setting is increased to a highest level H. During the coil winding step, the current setting is kept at the high value H to prevent any slacking of the wire, and the current setting is reduced back to the intermediate level M immediately before the completion of the coil winding step. While the current setting is kept at M or while the tension of the wire 2 is kept at an intermediate level, the hooking operation for the next core tooth is carried out. This process is repeated until all the coils for the armature 10 have been wound.

Thus, by utilizing this wire tensioner according to the present invention, it is possible to conduct a coil winding operation while applying an appropriate tension to the wire at all time so that coils may be wound without any slack and at a high density. By eliminating slack from the coil wire, the reliability of the motor can be improved. By increasing the density of the coil wire wound on each core tooth, the size of the motor can be reduced, and its performance can be improved.

Figure 3:
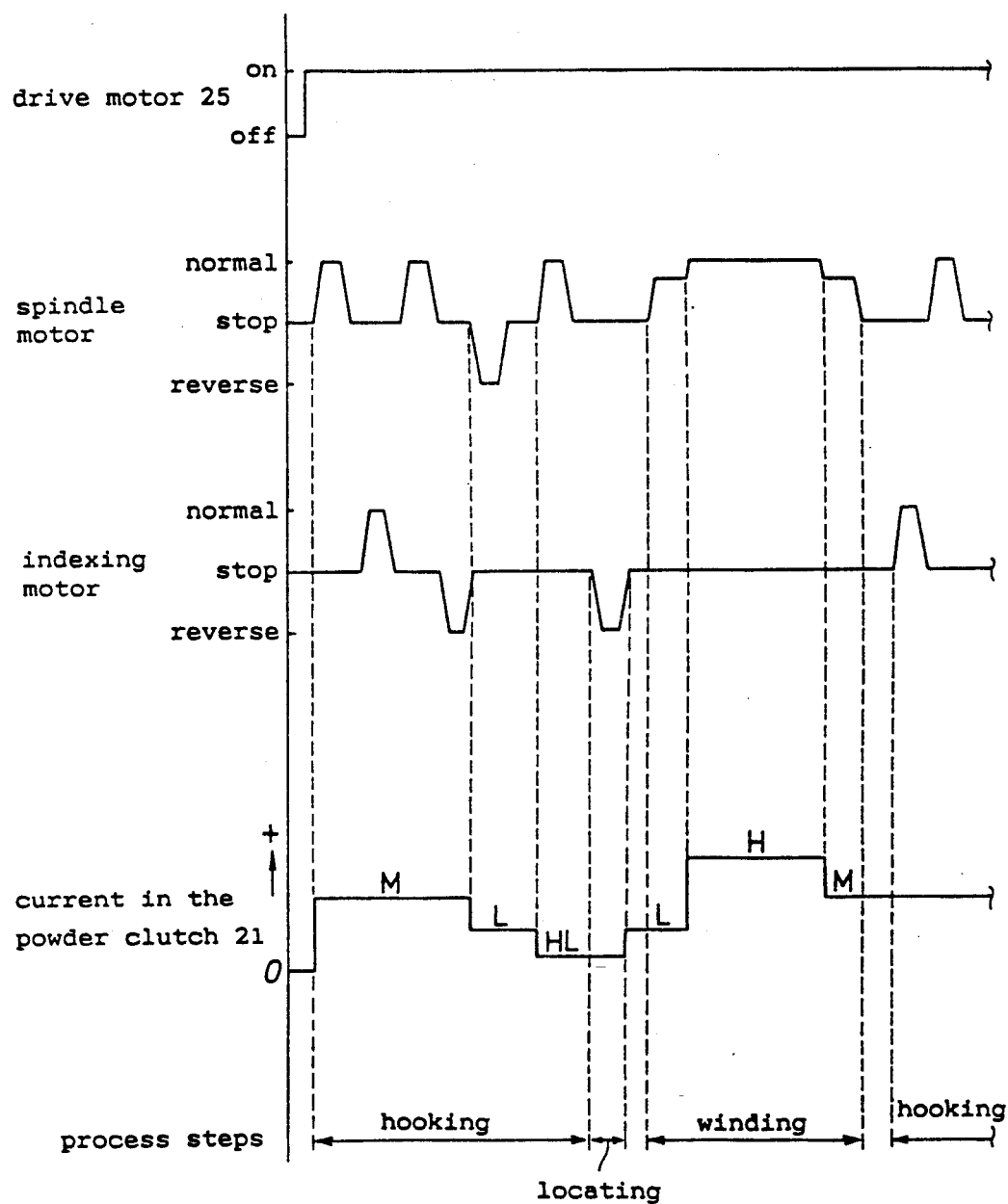
FIG. 3 is a time chart showing the mode of operation of the wire tensioner.

The time chart given in FIG. 3 is only an example, and can be modified in various manners to suit each particular application. Also, the clutch is not limited to electromagnetic powder clutch but may also be a hysteresis clutches and other clutches having a variable transmission capability.

The present invention can be applied to various other applications, and can handle wires of a wide range of diameter.

What we claim is:

1. A wire tensioner for feeding wire from a wire source to a wire handling machine according to a certain demand schedule, the operation of said wire handling machine including a plurality of steps, each of which requires that a different tension be applied to the wire fed to said wire handling machine, said wire tensioner comprising:

a frame;

a rotatable cylindrical body rotatably supported by said frame to wind a part of said wire thereon from a tangential direction thereof and feed out said wire in another tangential direction thereof;

power drive means for rotating said rotatable cylindrical body in a direction opposite to a feeding direction of said wire wound therearound, said power drive means including clutch means communicating with said rotatable body, and having a capability to vary a torque transmission ratio from said power drive means to said rotatable cylindrical body; and control means including a programmable control unit having said certain demand schedule pre-programmed therein, said control means acting upon said clutch means to vary said torque transmission ratio according to said certain demand schedule to thereby cause a different tension to be applied to the wire fed to said wire handling machine for the different steps of the operation thereof.

2. A wire tensioner according to claim 1, wherein said clutch means consists of an electromagnetic powder clutch.

3. A wire tensioner according to claim 1, further comprising means for clamping an outlet end of said wire.

4. A wire tensioner for feeding wire from a wire source to a wire handling machine while applying a variable tension to said wire, comprising:
 a frame consisting of first and second base plates which are spaced from each other in a parallel relationship;
 a clutch with a variable torque transmission capability interposed between said first and second base plates and having an output shaft projecting outwardly from said first base plate and an input shaft projecting outwardly from said second base plate;
 a guide pulley supported by a pivot shaft extending through said base plates and having one end projecting outwardly from said first base plate to guide said wire at an inlet end of said wire tensioner;
 a tension pulley drivingly coupled to said output shaft of said clutch to wind said wire thereon;
 a motor mounted on at least one of said base plates and having an output shaft projecting outwardly from said second base plate; and
 a drive belt passed around a first pulley secured to said output shaft of said motor, a second pulley secured to another end of said pivot shaft carrying said guide pulley projecting from said second base plate, and a third pulley drivingly coupled to said input shaft of said clutch.

* * * * *